United States Patent [19]

Matthews et al.

[11] Patent Number: 4,527,749
[45] Date of Patent: Jul. 9, 1985

[54] INTERFEROMETRIC FIBER OPTIC HYDROPHONE WINDING MACHINE

[75] Inventors: William G. Matthews, Baltic; Todd E. Whitaker, New London, both of Conn.

[73] Assignee: The United States of America as represented by the Secretary of the Navy, Washington, D.C.

[21] Appl. No.: 578,738

[22] Filed: Feb. 9, 1984

[51] Int. Cl.$^3$ .................. B65H 81/06; B65H 54/04
[52] U.S. Cl. .......................... 242/7.15; 242/7.21; 242/18 G; 242/156
[58] Field of Search ............... 242/7.15, 3, 7.21, 7.22, 242/18 G, 156

[56] References Cited

U.S. PATENT DOCUMENTS

| | | | |
|---|---|---|---|
| 2,260,921 | 10/1941 | Sibley | 242/3 |
| 2,315,332 | 3/1943 | Howe et al. | 242/3 |
| 2,462,393 | 2/1949 | Haynes | 242/7.15 |
| 2,571,243 | 10/1951 | Hooker | 242/7.15 X |
| 2,761,630 | 9/1956 | George | 242/7.15 |
| 2,964,252 | 12/1960 | Rosenberg | 242/7.15 |
| 2,988,292 | 6/1961 | Bliss | 242/7.15 X |
| 3,520,494 | 7/1970 | Anderson et al. | 242/7.21 X |
| 4,238,856 | 12/1980 | Bucaro et al. | 455/614 |

Primary Examiner—Stuart S. Levy
Assistant Examiner—Joseph J. Hail, III
Attorney, Agent, or Firm—Robert F. Beers; Arthur A. McGill; Michael J. McGowan

[57] ABSTRACT

A machine for winding, in a selected and consistent manner, a fiber optic filament on a compliant elastomeric mandrel, which assembly responds to acoustic waves by producing variations in diameter and light transmission characteristics of the fiber optic means. A motor rotates the mandrel at a selectable speed. A timing belt couples the mandrel rotation to a traversing mechanism supporting an optical fiber carrying reel and is adjustable to variably convert the rotary to linear motion. The shaft supporting the reel has brake means for adjusting the tension on the fiber. The fiber feeds over an idler roll which operates to count the number of meters of fiber wound on the mandrel, and then passes under a tension sensing roll. By varying mandrel rotation speed, traversing speed and reel drag, compliant hydrophone mandrels can have optical fibers wrapped therearound having many different fiber lay angles and fiber tensions, thus permitting production of hydrophones of desired characteristics.

4 Claims, 8 Drawing Figures

INTERFEROMETRIC FIBER OPTIC HYDROPHONE WINDING MACHINE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a precision optical fiber winding device and more particularly to a winding machine which permits precise control of reel drag, traversing speed, mandrel rotation speed, fiber tension and fiber lay angle.

(2) Description of the Prior Art

Certain interferometric optical hydrophones are based upon the phenomena that an optical fiber, when elongated, will alter the characteristics of the light transmitted in proportion thereto. A compliant, cylindrical mandrel such as a nylon rod or the like, when circumferentially wrapped with optical fiber, can take advantage of this phenomenon. This wrapped elastomeric mandrel, when exposed to an acoustic pressure, changes its length and, due to Poisson Effects, diameter. The optical fiber, being prestretched by tightly wrapping it around the mandrel, follows these diameter changes and thus elongates or contracts the optical path length in proportion to the acoustic signal. By way of example, a more complete description of a typical fiber optic hydrophone is set forth in U.S. Pat. No. 4,238,856.

At present interferometric hydrophones have mandrels handwrapped with the delicate optical fiber. A significant drawback of the handwrapped hydrophone is the lack of repeatable performance between one hydrophone and the next. This is because once mandrel material has been chosen, hydrophone performance depends strongly on two constructional parameters. First, the amount of initial fiber elongation present after the winding process dictates how easily the fiber will continue to elongate as the mandrel diameter increases or shrinks with diameter reduction. This fiber prestretch is directly controlled by the amount of back tension applied as the fiber is wound onto the mandrel. Handwrapping the fiber does not allow sufficient tension control during this initial fiber elongation. The second constructional parameter governing hydrophone performance is the distribution pattern of the fiber along the length of the mandrel. This fiber density is entirely dependent upon the lay angle of the fiber as it is wound onto the mandrel. Handwrapping does not permit the angular control necessary for consistent performance from hydrophone to hydrophone.

SUMMARY OF THE INVENTION

Accordingly, it is a general purpose and object of the present invention to provide an interferometric fiber optic hydrophone winding machine able to consistently wind delicate optical fibers onto compliant hydrophone mandrels without any degradation of the fiber properties. Another object is that the winding machine be able to vary two important parameters which strongly influence optical hydrophone performance, i.e., fiber lay angle and fiber pretension, thereby permitting the winding machine to serve as a research tool in optimal hydrophone design. A further object is that such a winding machine be able to employ single mode or multimode optical fiber. A still further object is that the machine be capable of producing a plurality of hydrophones having identical performance characteristics.

These objects are accomplished with the present invention by providing an interferometric fiber optic mandrel hydrophone winding machine comprising a rigid baseplate having mounted thereon hydrophone mandrel mounting means, optical fiber dispensing means attached to an adjustable traversing mechanism, electric motor means for rotating the mandrel and driving the traversing mechanism, and control panel means for controlling the winding operation and displaying optical fiber length and tension status. The optical fiber dispensing means includes a fiber reel stand, attached to the traversing mechanism, a journal mounted fiber reel, an idler roll and a lead roll, all bearing mounted thereon. Fiber tension is controlled by adjusting the drag on the reel shaft while a tension assembly attached to a force gage permits digital readout of fiber tension at the control panel. A microswitch operated pulse counter device operating in conjunction with the idler roll monitors the total fiber length already wrapped on the mandrel. By controllably varying mandrel rotation speed, reel stand traversing speed and direction, and reel drag, compliant hydrophone mandrels can thus have optical fibers wrapped therearound having preselected fiber lay angles and fiber tensions. This either permits a plurality of hydrophone variants to be produced for research programs or if desired allows production of large quantities of identical hydrophones.

A more complete understanding of the invention and many of the attendant advantages thereto will be readily appreciated as the same becomes better understood by reference to the following detailed description when considered in conjunction with the accompanying drawings wherein:

DESCRIPTION OF THE PREFERRED EMBODIMENTS

Figure 1:
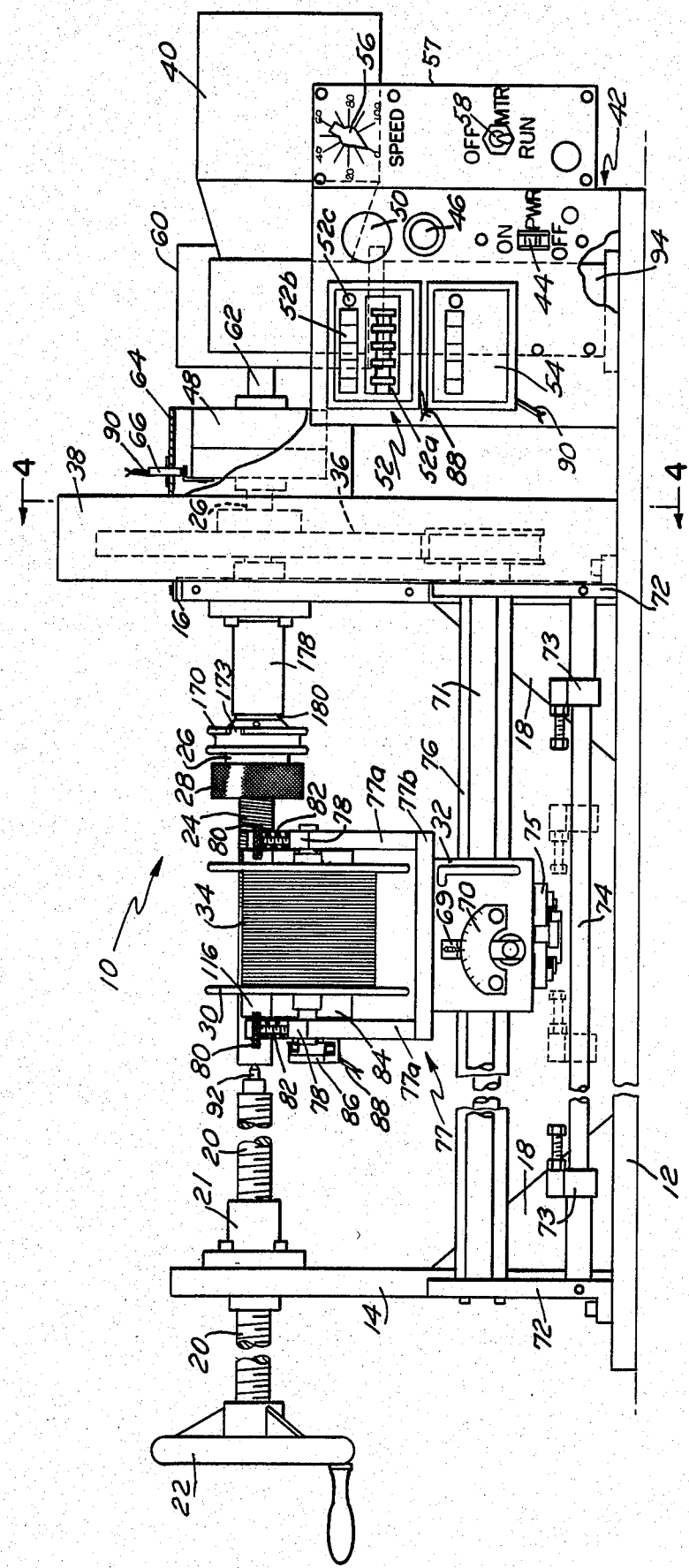
FIG. 1 shows a front view of a fiber optic hydrophone winding machine built according to the teachings of the present invention.

Referring now to FIG. 1 there is shown a front view of an interferometric optical hydrophone winding machine 10 comprising a rigid horizontal base plate 12 having first and second rigid vertical side plates 14 and 16 spaced a preselected distance apart and fixedly attached thereto. Side 14 and 16 are each braced by a plurality of rigid gussets 18 affixed so as to maintain 90° alignment with respect to plate 12 while remaining essentially parallel and coaxial to each other. Plates 12, 14 and 16 may be of any strong, lightweight material although aluminum is preferred. In addition to alignment considerations, such plate mounting of machine 10 also provides for machine portability without requiring disassembly. A long threaded shaft 20 passes through threaded support 21 which is fixedly attached to vertical plate 14 having the axis thereof parallel to plate 12. Shaft 20 has attached thereto a handle 22 and is used to center one end of compliant hydrophone mandrel 24. The other end of mandrel 24 is gripped by a collet housed within a bore in shaft 26, the collet being compressed by the knurled compression nut 28. A reel 30 is mounted atop an adjustable traversing mechanism 32. Reel 30 has a preselected length of optical fiber 34 wrapped therearound. Traversing mechanism 32 is coupled to shaft 26, via a timing belt 36 housed beneath belt guard 38 which may be aluminum or the like. An electric motor 40 is geared down and clutch coupled to shaft 26 which holds mandrel 24.

Machine 10 is operated using control panel 42. Power is supplied to machine 10 through main power switch 44. An emergency stop button 46 permits disengagement of electrically engaged clutch 48 at any time. Jog button 50, a momentary contact switch, allows the machine operator to incrementally rotate mandrel 24 to an appropriate starting position. An upper digital counter 52 is a preset type such as an Electronic Counters and Controls Inc., (ECCI) Model MU115A-1. The desired number of meters is set using a series of thumbwheels 52a. Display 52b shows the total number of meters of fiber that has been wound onto mandrel 24. Upon reaching the desired preset fiber length, counter 52 deactivates a relay coil disengaging drive shaft clutch 48. Button 52c is a reset device which zero's out display 52b. Lower counter 54, which may be an ECCI Model MU105A-1 or the like, totalizes and displays the number of revolutions of drive shaft 26, and hence mandrel 24, which is used as a check on the "meters" display 52b. A potentiometer 56 is used to regulate the mandrel rotational speed over a preselected range, e.g., from 0.4 to 12 revolutions per minute. Potentiometer 56 may be part of panel 42 or may be fixedly attached to the side of panel 42 within a separate box 57 such as a Boston Gear Ratiopax or the like.

Variable speed motor 40, controlled by motor run switch 58, attaches to the rear face of electrically operated clutch 48 through a suitable reduction gear box 60 having an output shaft 62. A clutch guard 64 fixedly attached to and protruding from belt guard 38, has mounted thereon a proximity switch 66, which provides the count pulse for "totalizer" counter 54 by sensing the number of times indicator 68 passes by.

Optical fiber reel 30 is mounted atop a traversing mechanism 32 which permits changes of optical fiber pitch angles and hence mandrel fiber density. While any rotary to linear motion converter may be used, a preferred variable mechanism is a Uhing Variable Pitch Traverses, Type RG 20/25, available commercially from Amacoil Machinery Inc. where the angle changes are accomplished by setting a control lever 69 at the desired position on dial 70. In such a unit rolling rings, controlled by lever 69, convert the rotational motion of shaft 71 driven by belt 36 into to linear travel parallel to the axis of mandrel 24. Shaft 71 is supported at either end by vertical members 72 fixedly attached to plate 12.

A pair of limit stops 73 are moveably mounted on traverse rod 74 which is parallel to shaft 71 and is also supported at each end by members 72. A reversing mechanism 75, located on the underside of traversing mechanism 32, upon encountering a limit stop 73 reverses the direction of traverse of mechanism 32. A third cross member 76, parallel to shafts 71 and 74, further adds strutural support.

Fiber reel 30 is mounted on a reel stand 77 which is fixedly attached to the top of traversing mechanism 32. Stand 77 further comprises a pair of vertical members 77a fixedly attached to horizontal member 77b Fiber 34 is fed from reel 30 the shaft of which rotatably mounts in journals having hinged top sections 78 to provide easy removal. Knurled captive screws 80 with springs 82 are used to provide adjustable drag on the reel shaft and thus act as a braking system for controlling tension in fiber 34. Fiber 34 is fed from reel 30 over an idler roll 84 which is arranged so as to provide the meter count for counter 52 of control panel 42. This meter count is provided by counting pulses from a microswitch 86 fixedly attached to one vertical member 77a. Six electrical pulses from switch 86 are stored in an appropriate circuit before one pulse is sent to counter 52 which increments the count by one meter. Switch 86 is connected to counter 52 via cable 88. The output signals of proximity switch 66 are transmitted by cable 90 to totalizer counter 54. Dead shaft 20 has a live center 92 housed in the working end thereof to assist in holding mandrel 24 steady during the winding operation. The length of threaded shaft 20 is selected to accommodate winding of mandrels of varying length. Motor 40 is supported by motor support stand 94 which is fixedly attached to plate 12.

Figure 2:
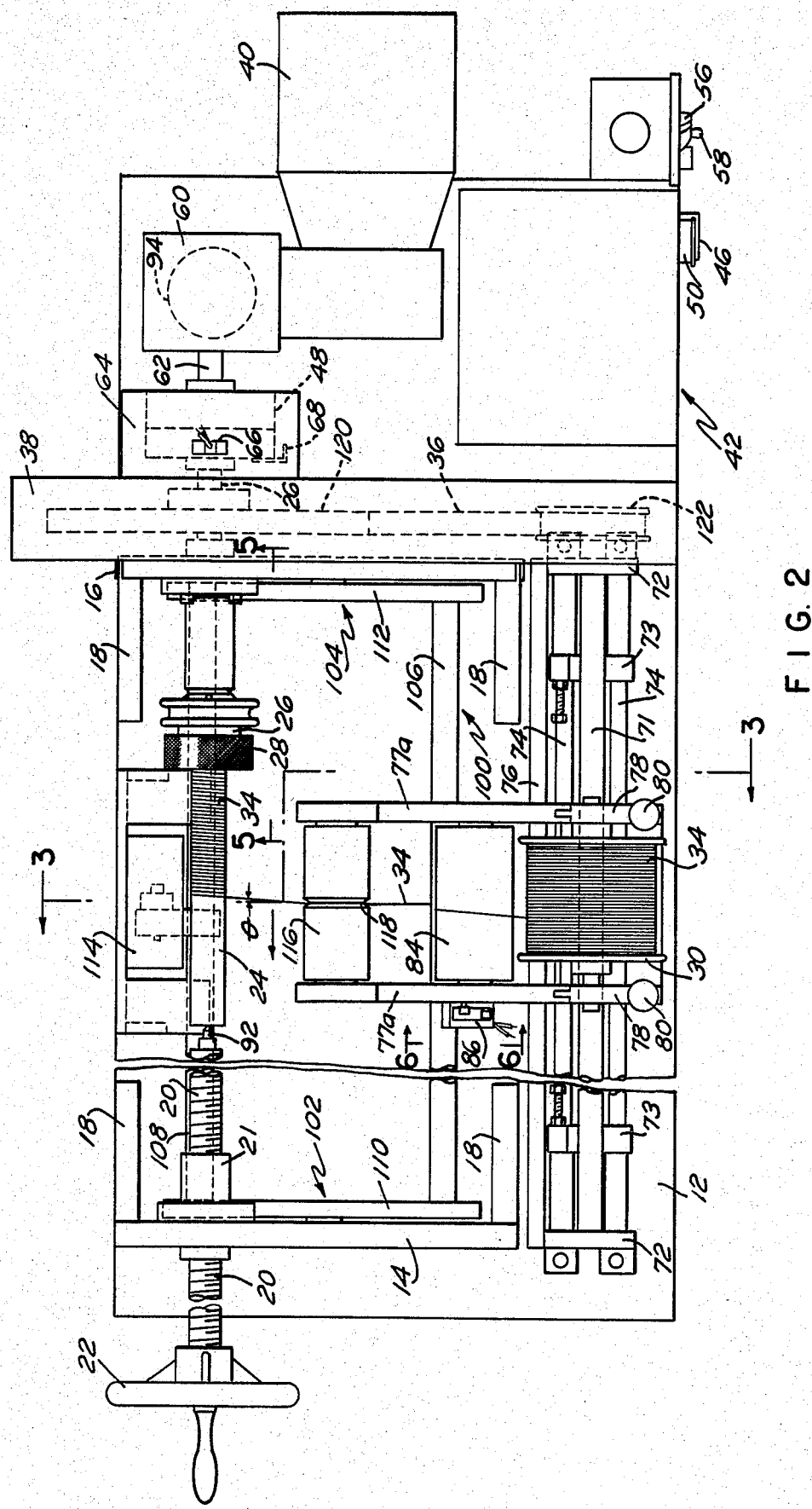
FIG. 2 is a top view of the winding machine of FIG. 1.

FIG. 2 shows a plan view of the machine of FIG. 1. From idler roll 84, fiber 34 is fed to a tension assembly 100. Assembly 100 is pivotably mounted on ball bearings at locations 102 and 104. Fiber 34 is fed under a tension roll 106. Roll 106 runs essentially parallel to mandrel 24 and also to a readout roll 108. Rolls 106 and 108 are secured at each end thereof to cross members 110 and 112 respectively thereby forming the rectangular frame which is tension assembly 100. The distance from locations 102 and 104 to rolls 106 and 108 are equal such that a movement of roll 106 causes an equal and opposite movement of roll 108. The tension assembly readout roll 108 is attached to a force gage 114 which provides a digital readout of fiber 34 tension. Knurled captive screws 80 are loosened or tightened to alter this tension. Tension roll 106 is preferably made of aluminum with a finish of teflon impregnated hard coat anodize. This permits lateral motion of fiber 34 with minimal tension changes and/or abrasion of fiber cladding. From tension roll 106, fiber 34 is then fed over lead roll 116 and onto mandrel 24. Lead roll 116 has an annular groove 118 at the midpoint thereof so that fiber 34 is maintained at the same spatial location relative to traversing mechanism 32 when passing onto mandrel 24 thus providing a constant pitch. Both lead roll 116 and idler roll 84 are bearing mounted. Movement of traversing mechanism 32, in the direction shown by the arrow, at a constant traverse rate causes fiber 34 to be wound onto mandrel 24 at a pitch angle $\theta$. Motor support stand 94 is shown to have a circular cross section for the vertical member thereof. This cross section is optional and may be varied.

Figure 3:
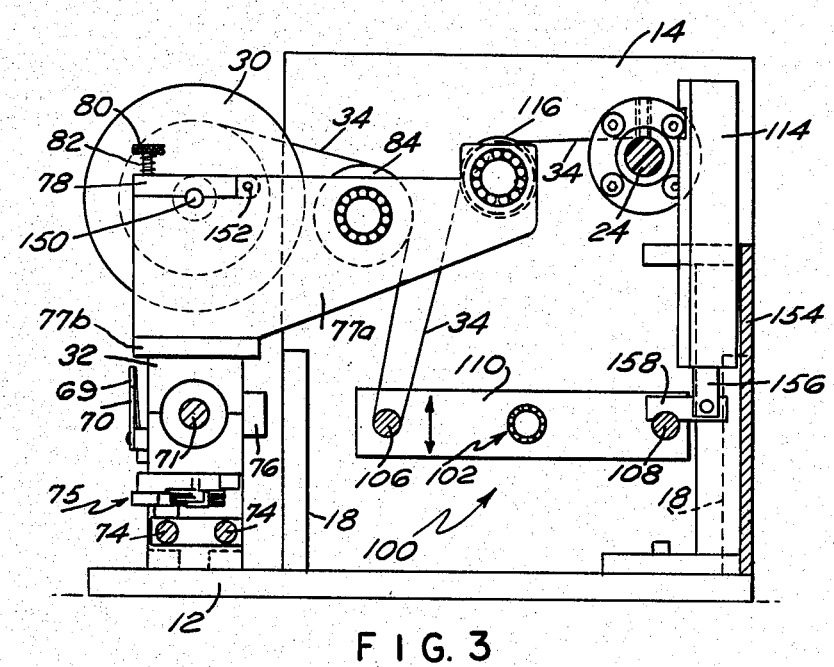
FIG. 3 is a sectional view of the device shown in FIG. 2 taken along line 3—3 thereof.

FIG. 3 shows in cross section the path which fiber 34 traverses during a typical winding operation. Fiber reel 30 plays out fiber 34 which passes over idler roll 84, then under tension roll 106, then over lead roll 116 to and around mandrel 24. Fiber tension is adjusted by tightening or loosening thumb-screws 80 which cause hinges 78 to rotate about pivot points 152 thereby varying the drag on the fiber due to friction imposed on fiber reel shaft 150. The fiber tension so produced causes a load on tension roll 106 which, due to the pivotability of tension assembly 100 about point 102, produces an equal force and opposite movement at roll 108. An analog or digital readout device 114 (although digital is preferred), is mounted on bracket 154, having a vertical actuating linkage 156 extending downward therefrom. Linkage 156 is pivotably connected to horizontal cross member 158 which rests on roll 108 and moves therewith producing proportional vertical movement of linkage 156. Device 114 is calibrated to produce a readout of fiber tension. A typical digital device 114 is a John Chatillion & Sons Model CFG-10.

Figure 4:
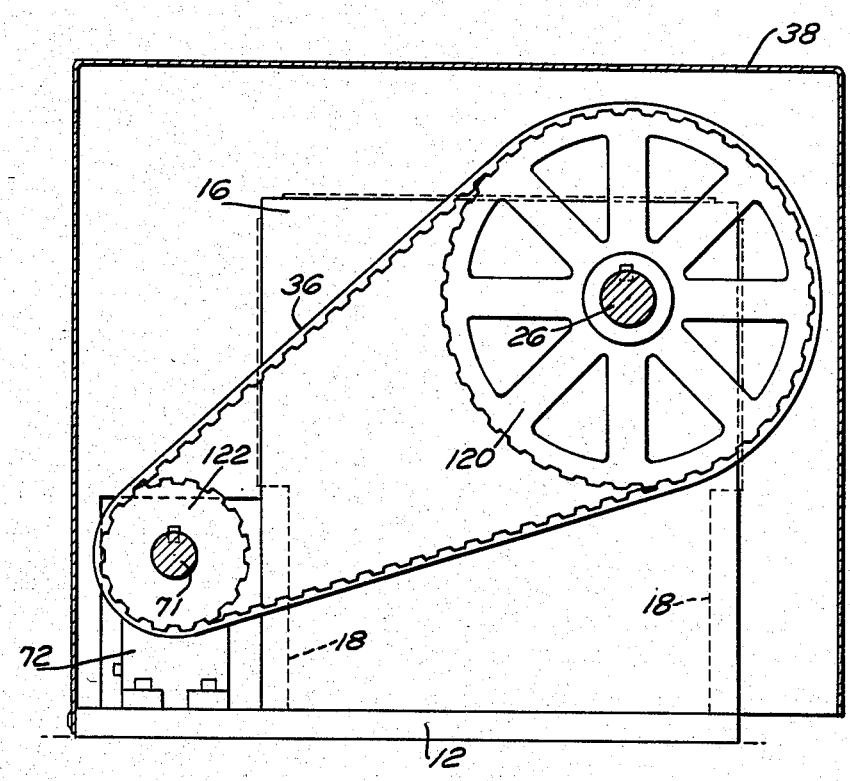
FIG. 4 is a sectional view of the device shown in FIG. 1 taken along line 4—4 thereof.

FIG. 4 shows the drive arrangement between mandrel drive shaft 26 and traversing mechanism shaft 71. Drive belt 36 is driven by primary gear 120 which in turn drives secondary gear 122. A typical gear ratio would be about 2½ to 1 respectively between gear 120 and gear 122, although this can be varied if desired. Both gears may attach to their respective shafts using any of a variety of well known means such as a key, a spline or the like.

Figure 5:
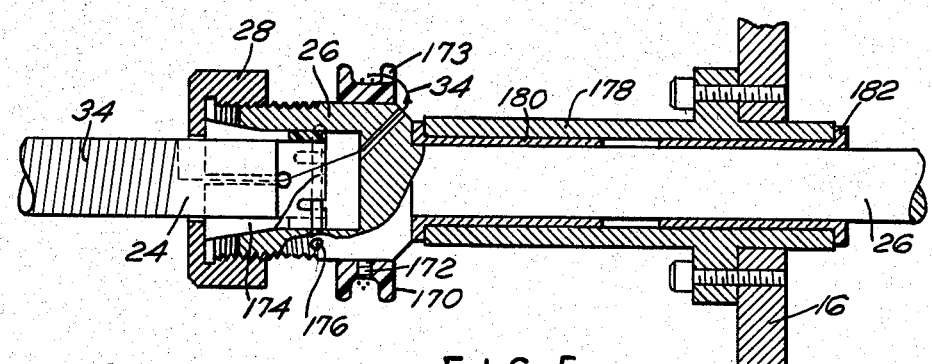
FIG. 5 is a cross-sectional view of the mandrel gripping device with mandrel inserted taken along line 5—5 of FIG. 2.

FIG. 5 shows how mandrel 24 is held securely by drive shaft 26. A compliant collet 174, beneath knurled compression nut 28, is slotted at the mandrel end thereof such that a plurality of evenly spaced gripping segments are formed at the tapered end. Upon tightening of nut 28, pressure is exerted in the direction of the shaft 26 bore, thereby forcing the tapered end of collet 174 against the tapered bore of shaft 26 forcing the gripping segments thereof to press axially against mandrel 24 gripping it securely while the slots extend beyond the mandrel end. The pigtail of fiber 34 is passed through one such slot while collet 174 clamps onto the mandrel. The fiber lead is then passed over the end of mandrel 24 and through the shaft bore. From there it is threaded out through a hole and wound onto a takeup reel 170 which is held in place against shaft 26 by set screw 172. A slot 173 may be utilized in one land of spool 170 for ease of winding. This gripping means protects fiber 34 during the winding operation.

Shaft 26 is moveably supported by support 178 which is fixedly attached to plate 16 such that the longitudinal axis thereof is parallel to plate 12. Journal bearings 180 and 182 permit shaft 26 to rotate.

Figure 6:
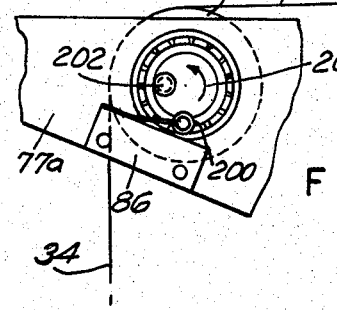
FIG. 6 illustrates the cam actuated micro switch which feeds the meters counter, viewed along line 6—6 of FIG. 2.

FIG. 6 shows the camming arrangement whereby the circumference of idler roll 84 is used to measure the length of fiber wound on mandrel 24. Normally open micro switch 86, fixedly mounted to suport 77a, has an actuating lever 200 extending therefrom. Idler roll 84 has concentric cylindrical protruding hubs 201 of smaller diameter extending from either end. A tapped hole is provided in one hub 201 lying generally parallel to the longitudinal axis of roll 84 and hub 201 but being offset therefrom so that roll rotation produces an eccentric motion by the head of a screw 202 which is installed in the tapped hole. As idler roll 84 rotates, screw 202 trips lever 200 closing switch 86 once per revolution. Roll 84 is sized such that one revolution equals one sixth of a meter. Surface finish of roll 84 is important as it must be rough enough to permit roll rotation at low fiber contact force while not damaging the fiber buffering or jacketing as the fiber passes thereover. A light sandblasted finish was found to work well.

Figure 7:
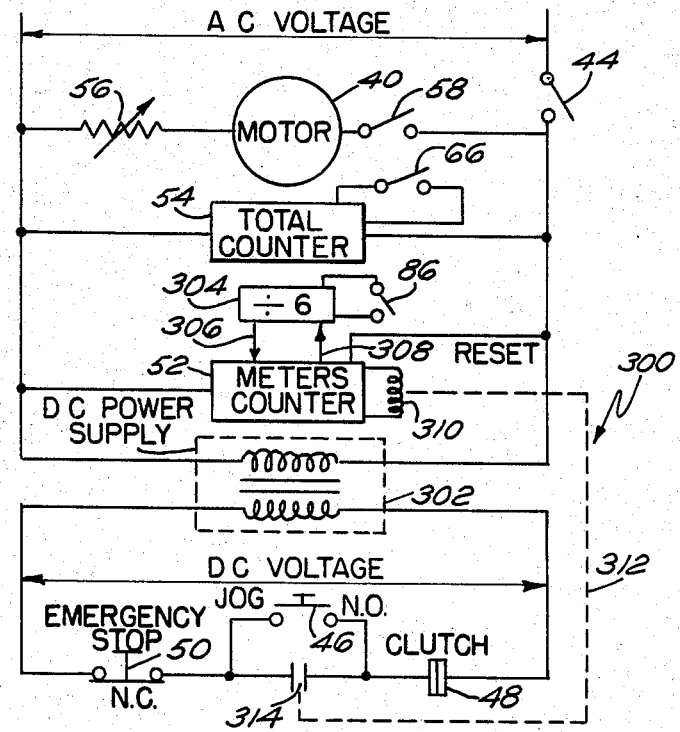
FIG. 7 is a block diagram of the electrical control system of the present invention.

FIG. 7 shows in block diagram form, the control circuit 300 used to operate machine 10. An AC source provides power concurrently to; variable speed motor 40, totalizer counter 54, meters counter 52 and DC power supply 302. The DC output of supply 302 is controllably used to engage/disengage clutch 48. Placing power switch 44 in the closed position allows motor 40 to run whenever motor run switch 58 is also closed. The speed at which the output shaft of motor 40 revolves is controlled by potentiometer 56. Motor shaft RPMs are monitored by totalizer counter 54 which counts the number of open/closed cycles of proximity switch 66. Meters counter 52 electricaly connects to a divide-by-six counting circuit 304 which transmits a count signal 306 to counter 52 for every six revolutions of idler roll 84 as sensed by cam operated micro switch 86. A reset connection 308 permits divide-by-six circuit 304 to be reset from counter 52 using button 52c. When counter 52 is set using thumbwheels 52a at some desired, non-zero fiber length (in meters) and while the present sensed count from circuit 304 is less than this preset value, coil 310 is activated which, via connection 312, closes DC contact 314 thus engaging clutch 48. DC power to clutch 48 then passes through emergency stop switch 50 which is normally closed. Upon reaching the preset fiber length, counter 52 deactivates coil 310 opening contact 314 thereby stopping the winding operation. It should be noted that clutch 48 is engaged even when motor 40's run switch 58 is open which permits the winding operation to commence upon closing switch 58. Conversely, by setting the meters count to zero and closing motor run switch 58, contact 314 is then open permitting the mandrel to be rotated incrementally by selectively closing normally open jog switch 46.

Figure 8:
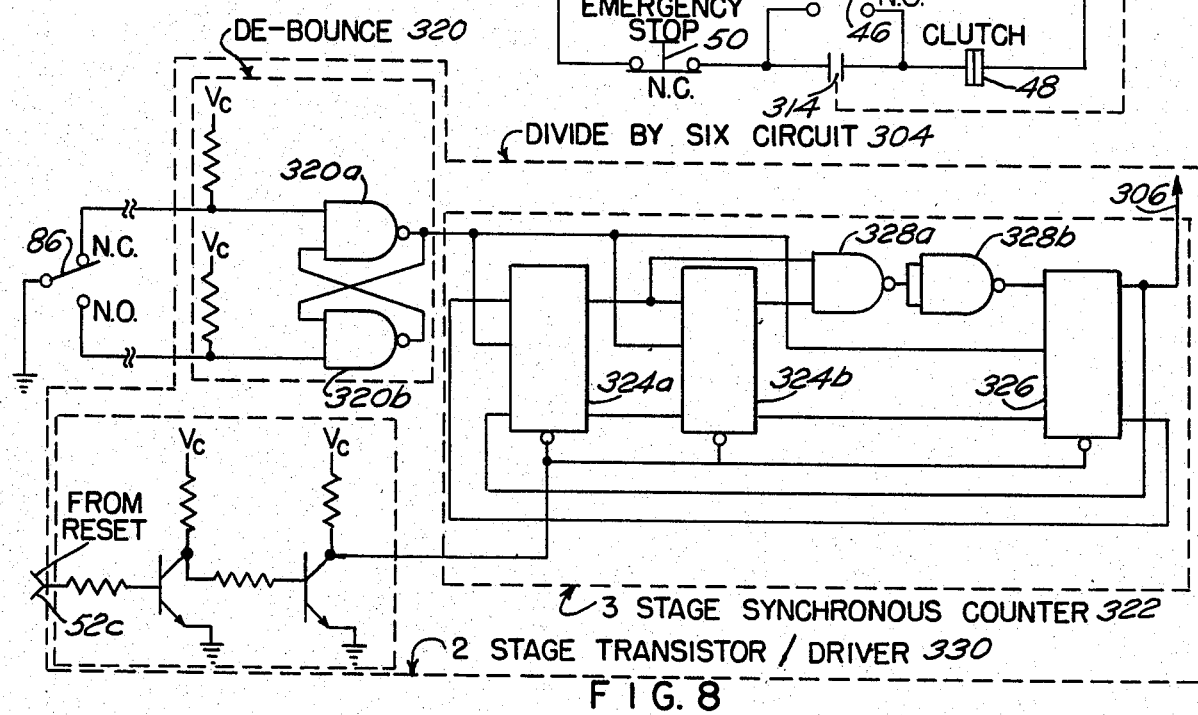
FIG. 8 is a circuit diagram of the divide-by-six functional block of FIG. 7.

FIG. 8 shows a detail schematic diagram of divide-by-six circuit 304 which supplies corrected control information to meters counter 52. The raw revolution count information from microswitch 86 is first fed to a switch "de-bounce" circuit 320 comprising two logic NAND gates 320a and 320b cross connected so as to prevent false triggering from entering counter circuitry. This conditioned pulse from de-bounce circuit 320 is next fed to a three-stage synchronous counter 322 comprising three J-K flip-flops 324a, 324b and 326 which simultaneously receive the pulse. Two logic NAND gates, 328a and 328b, are connected such that they perform an AND with the flip-flops. Standard logic techniques are used to count the received pulses. When the sixth pulse is received, the "divide-by-six" output line 306 is activated and feeds meter counter 52. Before a winding operation is begun, the "divide-by-six" circuit must be reset. This command is sent by meter counter reset button 52c and is conditioned by a two-stage transistor/driver circuit 330 such that the command voltage levels are compatible with the TTL counter circuitry.

The advantages of the interferometric fiber optic hydrophone winding machine are as follows: The machine has the ability to provide increased optical fiber care-in-handling. Careful attention has been given to all fiber bends to provide ample, controlled radii in all cases. Constant tension control eliminates any snap loading of the fiber, and during winding, no twists are introduced into the optical waveguide. The surface finish of the rolls prevent damage to the fiber buffering. These safeguards combine to insure minimal fiber degradation for optical hydrophone operation. Another significant advantage of the winding machine is its ability to aid in hydrophone research. The machine can be used to selectively alter the two constructional parameters which most affect hydrophone performance, i.e., lay angle and fiber tension. A handwrapped version would not permit the small, consistent, changes necessary for optimal design. A final enormous advantage of a hydrophone wound on the present machine over its conventional handwrapped counterpart is in repeatability. Machine 10 provides the ability to fabricate multiple hydrophones having substantially identical response characteristics. This is possible because of the precise control of key constructional parameters; i.e., fiber pretension, fiber lay angle and fiber length. Such repeatability is imperative when constructing multiple sensor array systems.

What has thus been described is a hydrophone winding machine comprising a rigid framework, having attached thereto hydrophone mandrel mounting means, optical fiber dispensing means attached to an adjustable traversing mechanism, electric motor means for synchronously rotating the mandrel and driving the traversing mechanism, and control panel means for controlling the winding operation while displaying optical fiber length and tension status. The optical fiber dispensing means further includes a fiber reel stand attached to the traversing mechanism, a journal mounted fiber reel, an idler roll and a lead roll, all bearing mounted thereon. Fiber tension is controlled by adjusting the drag on the reel shaft while a tension assembly attached to a force gage permits digital readout of fiber tension at the control panel. A micro switch/pulse counter device attached to the idler roll monitors the total fiber length already wrapped on the mandrel. By varying mandrel rotation speed, reel stand traversing speed and direction, and reel drag compliant hydrophone mandrels thus can have optical fibers wrapped therearound having preselected fiber lay angles and fiber tensions thereby permitting many hydrophone variants to be produced for research programs and/or allowing production of a quantity of identical hydrophones.

Obviously many modifications and variations of the present invention may become apparent in light of the above teachings. For example: Single mode or multimode fiber may be wound on this machine. Materials used for plates, rolls, shafts, etc may be varied. A second fiber tensioning device may be added at roll 108 without deviating from the teachings of the present invention.

In light of the above, it is therefore understood that within the scope of the appended claims, the invention may be practiced otherwise than as specifically described.

What is claimed is:

1. An apparatus for winding optical fiber on a compliant, cylindrical mandrel so as to form an interferometric optical hydrophone, said apparatus comprising:

a rigid horizontal, rectangular base plate having longitudinal and transverse axes;

a first vertical support plate, fixedly attached to said base plate parallel to one of the shorter ends thereof, said first vertical support plate having the axis orthogonal to the plane of said first support plate aligned parallel to said longitudinal axis of said base plate;

a second vertical support plate, spaced a preselected distance away from said first vertical support plate and fixedly attached to said base plate, said second vertical support plate being generally parallel to and coaxial with said orthogonal axis of said first support plate such that said base plate is divided into a first mounting area lying between said first and second vertical supports, a second mounting area adjacent to and contiguous with said first mounting area and a third mounting area adjacent to said second vertical support plate on the side thereof facing away from said first vertical support plate;

traversing means, extending parallel to said longitudinal axis of said base plate and mounted to said second mounting area, for providing controlled helical payout of said optical fiber onto said compliant, cylindrical mandrel by controllably traversing the distance between said first and second vertical plates, said traversing means further comprising a traversing mechanism, capable of converting rotary motion from said drive means to linear travel, said mechanism traversing forward and back along a shaft extending parallel to the common axis of said first and second vertical plates, and having a traverse speed varying means as part thereof, an optical fiber dispensing stand, fixedly mounted atop said traversing mechanism, for providing a dispensing platform for said optical fiber, a reel, wound with a preselected length of said optical fiber, said reel being rotatably attached to said optical fiber dispensing stand, and tension adjusting means, attached to said reel, for adjustably varying fiber tension as desired;

tension sensing means, mounted between said first and second vertical plates, for sensing and indicating the amount of tension in said optical fiber comprising a rectangular frame, having a parallel pair of equal length longer members and a parallel pair of equal length shorter members oriented orthogonally thereto and being rigidly attached to form said frame, said frame being pivotably attached at the midpoint of each shorter member thereof, one each of said shorter members attaching to said first and second vertical supports, for rotatably responding to increases or decreases in said optical fiber tension; a force gage, moveably attached to said frame, for responding to said frame rotation by indicating the fiber load thereon; and a gage support means, fixedly attached to said first mounting area, for rigidly holding said force gage at a preselected location midway between said first and second vertical support plates;

drive means, rigidly attached to said base plate on said third mounting area, for providing a common source of controllable motive power to said traversing means and said compliant, cylindrical mandrel; and control means, connected to said drive means and said traversing means, for selectively controlling fiber payout rate, tension, lay angle and total length.

2. A winding apparatus according to claim 1 wherein said drive means further comprises:

variable speed electric motor means having a rotatable output shaft extending therefrom, for providing said motive power to said apparatus;

electrically actuatable clutch means, controllably attached to said motor means output shaft, for selectively transmitting said rotary shaft motion;

mandrel clamping means, fixedly attached to said clutch means, for clamping said compliant, cylindrical mandrel securely and rotating in conjunction with with said clutch means;

a primary drive gear, fixedly attached to said mandrel clamping means, for receiving rotatary motion from said clamping means;

a drive belt, rotatably attached to said primary gear, for transmitting said rotary motion from said primary gear;

a secondary drive gear, fixedly attached to said traversing means longitudinal shaft, and rotatably engaged to said drive belt means, for receiving said rotary motion from said primary gear and rotating said longitudinal shaft thereby; and support stand means, fixedly attached to said third mounting area and to said motor means for rigidly supporting said electric motor means.

3. A winding apparatus according to claim 2 wherein said control means further comprises:

a main power switch for providing AC power to said control means;

a motor-run switch, connected in series with said electric motor means for controlling the supply of said AC power to said motor means;

a potentiometer, connected in series with said electric motor means and said motor-run switch, for selectively varying the rotation speed of said motor means output shaft;

a total counter, connected so as to receive AC power from said main power switch, for keeping a count of the total number of revolutions of said mandrel clamping means;

a proximity switch, fixedly attached to said mandrel clamping means and connected to said total counter, for providing one count pulse per clamping means revolution to said total counter;

a meters counting means, connected so as to receive AC power from said main power switch, for controllably counting the length of said fiber which has been wound onto said mandrel and terminating said winding operation upon reaching a preselected setting;

a DC power supply, connected so as to receive AC power from said main power switch, for converting said AC power to DC power used to engage said clutch;

a normally closed emergency stop switch, connected in series with said clutch, for selectably disengaging said clutch as desired;

a normally open relay contact, connected in series with said stop switch and said clutch means, for controllably closing upon command from said meters counting means; and a normally open jog switch, connected in parallel with said relay contact, for selectively and incrementally rotating said mandrel to a preselected starting position.

4. A winding apparatus according to claim 3 wherein said meters counting means further comprises:

a meters counter further including a meters display, a reset button and a fiber length setting device, said reset button being used to zero said display prior to said winding operation;

a cam actuated micro switch, mounted to said traversing means, for producing an electrical pulse for every one sixth of a meter of said fiber dispensed from said reel;

a divide-by-six circuit, connected to said meters counter and said micro switch, for receiving and counting said electrical pulses, and transmitting one meter count pulse to said meters counter for every six pulses received from said micro switch, and;

a relay operating coil, connected to said meters counter, for controllably closing said relay contact to said clutch means whenever a preset non-zero meters setting is greater than the current meters count.

* * * * *